(12) United States Patent
Mercado

(10) Patent No.: US 6,305,810 B1
(45) Date of Patent: Oct. 23, 2001

(54) INFANT VIEWING DEVICE

(76) Inventor: Elizabeth A. Mercado, 19741 Ridgewood Pl., Yorba Linda, CA (US) 92886

( * ) Notice: Subject to any disclaimer, the term of this patent is extended or adjusted under 35 U.S.C. 154(b) by 0 days.

(21) Appl. No.: 09/593,065

(22) Filed: Jun. 13, 2000

(51) Int. Cl.$^7$ ................................................ G02B 7/182
(52) U.S. Cl. .................. 359/872; 359/881; 359/862; 248/469; 362/144
(58) Field of Search .................... 359/844, 857, 359/860, 862, 863, 865, 871, 881, 872; 362/142, 144; 248/469

(56) References Cited

U.S. PATENT DOCUMENTS

| 4,702,572 | 10/1987 | Cossey . |
| 4,712,892 | 12/1987 | Masucci . |
| 4,733,956 | 3/1988 | Erickson . |
| 4,902,118 | 2/1990 | Harris . |
| 4,909,618 | 3/1990 | Gardner . |
| 5,285,321 | 2/1994 | Nolan-Brown . |
| 6,039,455 | * 3/2000 | Sorenson .............................. 362/142 |

OTHER PUBLICATIONS

Eye Spy™ Teddy Bear. Advertisement. SafeFit, 2000 [retrieved on Aug. 24, 2000]. Retrieved from Internet: <URL: http://safefit.com/2000/csm/50022.htm>.

* cited by examiner

Primary Examiner—Cassandra Spyrou
Assistant Examiner—Mark A. Robinson
(74) Attorney, Agent, or Firm—Mark B. Garred; Stetina Brunda Garred & Brucker

(57) ABSTRACT

A device for viewing or observing an infant within a rearwardly facing infant car safety seat disposed upon the rear seat of a vehicle such as an automobile. The viewing device comprises a base unit which is attachable to the safety seat, and an elongate, bendable stem, the proximal end of which is releasably attached to the base unit. The viewing device further comprises a reflective surface which is attached to the distal end of the stem. The stem may be bended or deformed to maintain the reflective surface at a selected orientation relative to the safety seat, and more particularly to the infant residing within the safety seat.

18 Claims, 3 Drawing Sheets

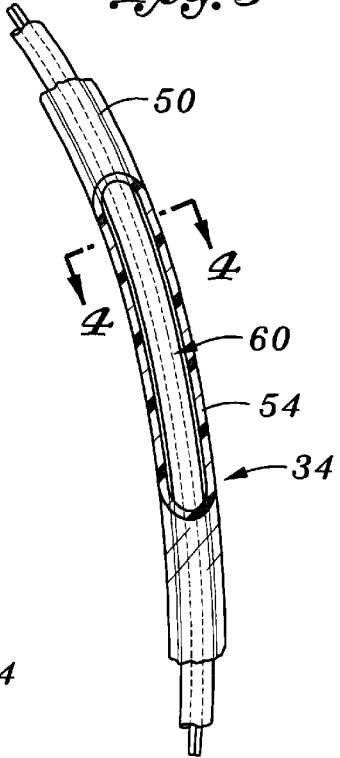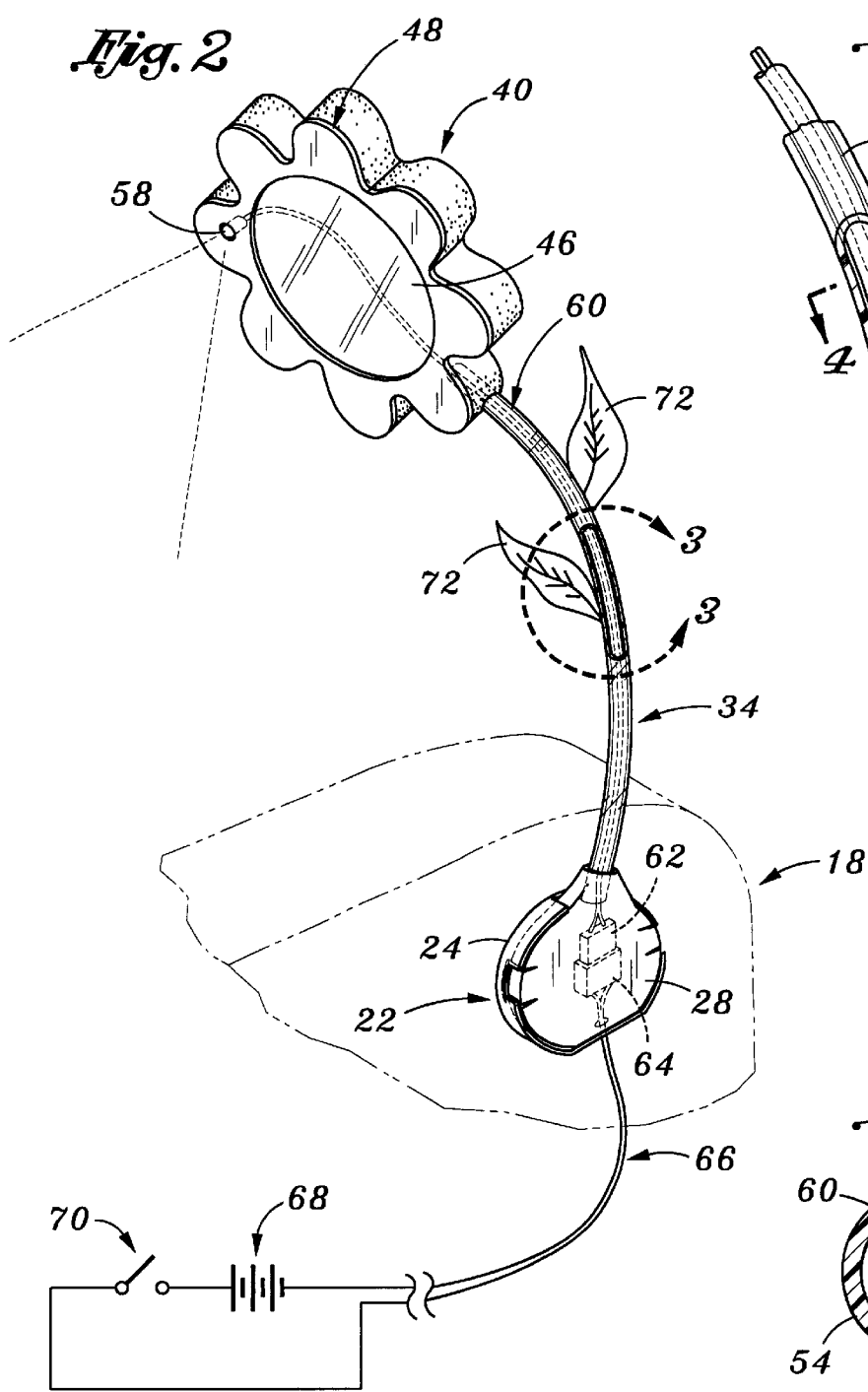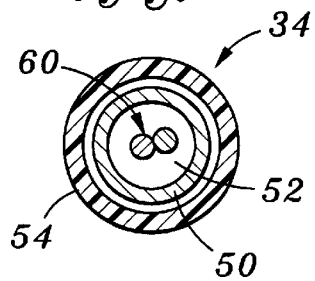

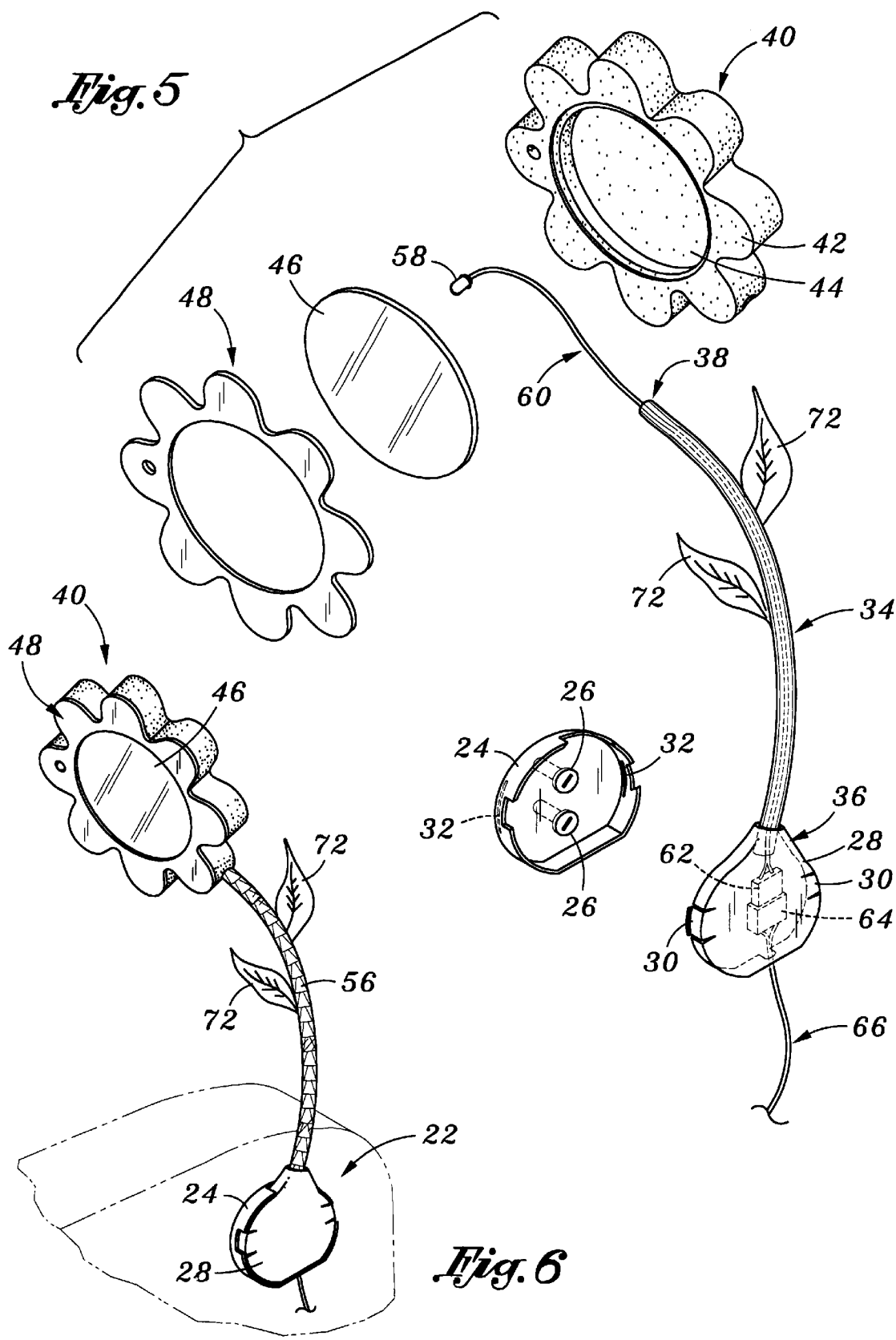

INFANT VIEWING DEVICE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to the field of automotive safety, and more particularly to an infant viewing device which permits the driver of a vehicle to observe the position and condition of an infant occupant on the rear seat of the vehicle.

In November, 1983, the federal government passed into law the "Child Passenger Protection Act" requiring that an infant traveling in a vehicle be secured in a car safety seat that is itself fastened to the rear seat of the vehicle by means of seatbelts, with the infant facing toward the rear of the vehicle. It has become a common practice as a result of the recommendations of child safety advocates to position the car safety seat such that the infant faces the rear of the vehicle. Indeed, many child protection groups have stated that this form of travel is recommended for babies up to seven to twelve months old and/or twenty pounds in weight, whichever comes first.

Most infant safety seats include a high back and/or are constructed with side panels that often obstruct any view of the infant when the infant is in the safety seat facing rearward. Thus, in many instances, the infant is not readily visible to the driver of the vehicle or to the occupant of the vehicle adjacent to the driver. Since the position and condition of the infant is not observable by occupants of the front seat, the infant's needs and condition are not readily discernable. As a result, when the driver or passenger in the front seat of the vehicle wishes or needs to observe or check on the condition of the infant in the safety seat, the driver or passenger must turn his/her body and lean back over the front seat. This procedure is not only inconvenient but dangerous should the driver be the one attempting to observe the infant since the driver will be forced to take his/her eyes off the road. Although the driver or passenger in the front seat oftentimes has attempted to use either the rear view mirror or the visor mirror to observe the infant so positioned on the rear seat, such practice is awkward, cumbersome, and does not present ready convenience for such a procedure. Indeed, if the driver is alone, the driver is put into the position of having to stop the vehicle and perhaps even get out of the same in order to check on the infant. This practice is also inconvenient at best, and dangerous at worst if there is no safe roadside location to which the driver may safely drive the vehicle.

In recognition of the foregoing, various prior art devices have been developed in an attempt to provide a modality by which a rearwardly facing infant may be viewed or observed in a car safety seat. Such devices are disclosed in U.S. Pat. Nos. 4,702,572 entitled SYSTEM FOR VIEWING AN INFANT IN THE REAR SEAT OF A VEHICLE issued Oct. 27, 1987, U.S. Pat. No. 4,712,892 entitled REAR SEAT MIRROR issued Dec. 15, 1987, U.S. Pat. No. 4,733,956 entitled MIRROR SAFETY SYSTEM FOR VIEWING THE REAR SEAT OF AN AUTOMOBILE issued Mar. 29, 1988, U.S. Pat. No. 4,902,118 entitled INFANT OBSERVATION MIRROR FOR CAR TRAVEL issued Feb. 20, 1990, U.S. Pat. No. 4,909,618 entitled MIRROR FOR VIEWING INFANT IN REAR SEAR CARRIER issued Mar. 20, 1990, and U.S. Pat. No. 5,285,321 entitled DEVICE FOR OBSERVING INFANT IN REAR SEAT issued Feb. 8, 1994.

Though the devices disclosed in the above-identified patents address the need for viewing a rearwardly facing infant in a car safety seat, these devices possess certain deficiencies which detract from their overall utility. More particularly, the device described in the '956 Patent is mounted to the inner surface of the rear window of the vehicle, with the device described in the '618 Patent being mounted to that portion of a vehicle between the rear seat and the rear window. The devices disclosed in the '572, '892, '118 and '321 Patents are each mounted directly to the rear seat of the vehicle. In this respect, none of the devices described in the above-identified patents is attached directly to the car safety seat. Due to their relatively small size and position/location a relatively significant distance from the infant within the car safety seat, the devices described in the above-identified patents are difficult to properly position in a manner providing for optimal viewing of the infant within the car safety seat. Indeed, the relatively small size of these devices coupled with the relatively large separation distance between the same and the infant within the car safety seat often results in the infant moving out of view when the infant leans its head to one side in the car safety seat. Additionally, none of these devices provide any type of illumination means for purposes of allowing the same to be used in viewing or observing the infant at night.

The present invention addresses the above-described deficiencies of the prior art viewing devices described in the aforementioned patents by providing a viewing device which is mountable directly to the car safety seat and includes a reflective surface (i.e., a mirror) which is selectively positionable in relative close proximity to, but out of the reach of, an infant residing within the safety seat. The present viewing device also includes an illuminable lamp which allows for the viewing of the infant during nighttime driving. Because it is mounted directly to the car safety seat, any shifting or movement of the car safety seat relative to the rear seat does not result in the disruption of the proper orientation of the reflective surface relative to the infant within the safety seat. Additionally, the relative close proximity of the reflective surface to the infant's head maintains the proper viewing angle despite the infant leaning its head to one side. These, as well as other advantages of the present invention, will be discussed in more detail below.

BRIEF SUMMARY OF THE INVENTION

In accordance with the present invention, there is provided a device for viewing or observing an infant within a rearwardly facing safety seat disposed on the rear seat of vehicle such as an automobile. The viewing device comprises a base member or unit which is attachable to the safety seat. More particularly, the base unit itself comprises a base mount which is rigidly attachable to the safety seat and a base housing which is releasably attached to the base mount. The base mount and the base housing are each preferably fabricated from a plastic material.

In addition to the base unit, the viewing device of the present invention comprises an elongate, bendable or deformable stem having opposed proximal and distal ends. The proximal end of the stem is attached to the base unit, and more particularly to the base housing thereof. Attached to the distal end of the stem is a decorative support member which defines a generally planar viewing surface having a recess formed therein. The support member is preferably fabricated from a foam rubber material. Disposed within the recess of the support member is a reflective surface of the viewing device which preferably comprises a domed mirror which is fabricated from a plastic (e.g., acrylic) material attached to the support member through the use of, for example, an adhesive. The recess and the reflective surface or mirror preferably have complimentary, generally circular configurations, with the mirror being received into the recess of the support member in a nesting fashion. The viewing device may further comprise a cover member which is attached to the viewing surface of the support member and circumvents or extends about the reflective surface or mirror. The cover member will typically have a peripheral edge profile or contour which is identical to that of the support member, and is preferably fabricated from either a foam rubber or felt material.

The stem of the present viewing device preferably comprises a tubular inner core and an outer sleeve or sheath which is extended over or wrapped about the core. Both the core and the sheath are preferably fabricated from a bendable or deformable material. More particularly, the core is preferably fabricated from either a metal or plastic material, with the sheath being fabricated from either a plastic, foam rubber, or felt material. The sheath may be provided in a generally tubular configuration which is advanced over the core or as an elongate strip which is wrapped about the core. The core may alternatively have a solid cross-sectional configuration rather than being tubular, with such solid core preferably being fabricated from a bendable or deformable soft metal material. Additionally, it is contemplated that the stem may be fabricated from a multiplicity of plastic links which are pivotally connected to each other in end-to-end fashion. Moreover, the sheath need not necessarily be included as part of the stem of the present viewing device.

The viewing device of the present invention further preferably comprises a low voltage light or lamp (i.e., a light emitting diode (LED)) which is disposed within the viewing surface in close proximity to the reflective surface or mirror. If the cover member is included in the viewing device and attached to the viewing surface, it is contemplated the lamp will extend through the cover member. Electrically connected to the lamp is the first end of an elongate primary wire segment, the opposed, second end of which is electrically connected to a first coupler. Electrically connected to the first coupler is a second coupler. Electrically connected to the second coupler is the first end of an elongate secondary wire segment, the second end of which is electrically connected to a power supply. A switch is also provided in the present viewing device which is electrically connected to the power supply and operative to selectively place the lamp into electrical communication therewith via the primary and secondary wire segments and the first and second couplers. The first and second couplers are releasably attached to each other, and may be detached from each other upon the detachment of the base housing from the base mount.

If the core of the stem is fabricated from a tubular metal or plastic material, it is contemplated that the primary wire segment will extend through the interior or lumen of such tubular core and through the interior of the support member. If the core is fabricated from the aforementioned links or from a non-tubular material having a solid cross-section, it is contemplated that the primary wire segment may be extended between the core and the sheath, or advanced along the outer surface of the core and covered by the sheath wrapped thereabout.

BRIEF DESCRIPTION OF THE DRAWINGS

These, as well as other features of the present invention, will become apparent upon reference to the drawings wherein:

FIG. 2 is a perspective view of the present infant viewing device as mounted to a car safety seat;

FIG. 3 is an enlargement of the encircled region 3—3 shown in FIG. 2, illustrating the construction of the stem of the present infant viewing device;

FIG. 4 is a cross-sectional view taken along line 4—4 of FIG. 3;

FIG. 5 is an exploded view of the present infant viewing device; and

FIG. 6 is a perspective view similar to FIG. 2 illustrating the manner in which the present infant viewing device is mounted to a car safety seat.

DETAILED DESCRIPTION OF THE INVENTION

Figure 1:
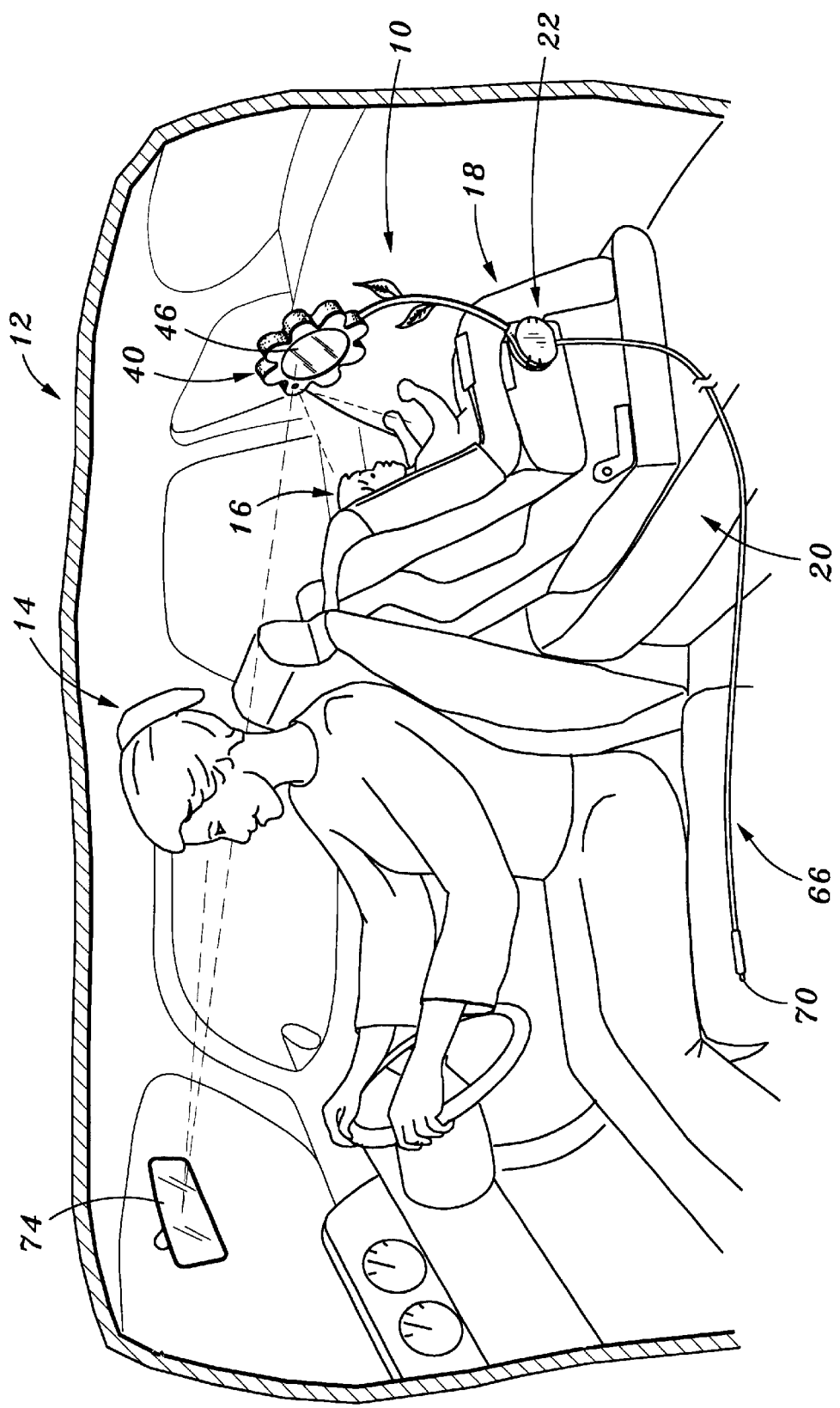
FIG. 1 is a perspective view of the infant viewing device of the present invention, illustrating an exemplary manner in which the device is used in a vehicle.

Referring now to the drawings wherein the showings are for purposes of illustrating preferred embodiments of the present invention only, and not for purposes of limiting the same, FIG. 1 perspectively illustrates an infant viewing device 10 constructed in accordance with the present invention as used in an exemplary manner within a vehicle 12 for purposes of allowing the driver 14 of the vehicle 12 to view or observe an infant 16 positioned within a rearwardly facing car safety seat 18 disposed upon the rear seat 20 of the vehicle 12. Referring now to FIGS. 2–6, the viewing device 10 comprises a base unit 22 which is attachable to the safety seat 18. The base unit 22 itself comprises a base mount 24 which is rigidly attachable to the safety seat 18 through the use of, for example, a pair of fasteners 26 such as screws or clamps. In addition to the base mount 24, the base unit 22 comprises a base housing 28 which is releasably attached to the base mount 24. The base housing 28 and base mount 24 are sized relative to each other such that the base housing 28 is received into the base mount 24 in a nesting fashion when releasably attached thereto. As best seen in FIG. 5, the base housing 28 includes an opposed pair of release tabs 30 which are partially insertable into respective ones of a pair of slots 32 formed within the base mount 24. The application of compressive pressure concurrently to the release tabs 30 facilitates the inward flexion thereof toward each other as removes portions thereof from within the slots 32, thus allowing the base housing 28 to be separated from the base mount 24. The receipt of the release tabs 30 into the slots 32 maintains the base housing 28 in engagement to the base mount 24. The base mount 24 and base housing 28 are each preferably fabricated from a plastic material.

In addition to the base unit 22, the viewing device 10 of the present invention comprises an elongate, bendable or deformable stem 34 having a proximal end 36 and a distal end 38. The proximal end 36 of the stem 34 is rigidly attached to the base unit 22, and more particularly to the base housing 28 thereof as best seen in FIGS. 2 and 5. Attached to the distal end 38 of the stem 34 is a decorative support member 40 of the viewing device 10. The support member 40 defines a generally planar viewing surface 42 having a circularly configured recess 44 formed therein. The support member 40 is preferably fabricated from a foam rubber material, with the distal end 38 of the stem 34 preferably being advanced thereinto and secured therewithin through the use of, for example, an adhesive.

Disposed within the recess 44 of the support member 40 is a reflective surface of the viewing device 10 which preferably comprises a circularly configured mirror 46 sized to be receivable into the recess 44 in a nesting fashion. Those of ordinary skill in the art will recognize that the mirror 46 and recess 44 may have complimentary configurations other than circular configurations. The mirror 46 may be either planar or domed, and is preferably fabricated from a plastic material. Additionally, the mirror 46 is preferably secured to that surface of the support member 40 defining the bottom of the recess 44 through the use of an adhesive.

The viewing device 10 of the present invention may further comprise a cover member 48 which is attached to the viewing surface 42 of the support member 40 and circumvents or extends about the mirror 46. As seen FIGS. 2, 5 and 6, the cover member 48 preferably has a peripheral edge profile or contour which is identical to that of the support member 40. In the viewing device 10, the support member 40 and cover member 48 preferably have a configuration mimicking that of a flower, though those of ordinary skill in the art will recognize that the support member 40 and cover member 48 may be provided in alternative decorative configurations. The cover member 48 is preferably fabricated from either a foam rubber or felt material, and is preferably attached to the viewing surface 42 through the use of an adhesive. However, as indicated above, the cover member 48 need not necessarily be included in the viewing device 10.

Referring now to FIGS. 2–4, the stem 34 of the viewing device 10 preferably comprises a tubular inner core 50 which defines a lumen 52 extending longitudinally therethrough. In addition to the inner core 50, the stem 34 comprises an outer sleeve or sheath 54 which is extended or advanced over the inner core 50. Both the inner core 50 and outer sheath 54 are preferably fabricated from a bendable or deformable material. More particularly, the inner core 50 is preferably fabricated from either a metal or plastic material, with the outer sheath 54 preferably being fabricated from either a plastic, foam rubber or felt material. As seen in FIGS. 2–4, the outer sheath 54 is preferably provided in a generally tubular configuration which is advanced over the inner core 50. Though not shown, the outer sheath 54 may be provided as an elongate strip which is wrapped about the inner core 50. Rather than being tubular, the inner core 50 may alternatively have a solid cross-sectional configuration, with such solid inner core 50 preferably being fabricated from a bendable or deformable soft metal material. Further, as seen in FIG. 6, it is contemplated that the stem 34 may be fabricated from a multiplicity of plastic links which are pivotally connected to each other in end-to-end fashion. The outer sheath 54 is advanced over or wrapped about such interconnected links 56. Moreover, those of ordinary skill in the art will recognize that the outer sheath 54 need not necessarily be included as part of the stem 34 of the viewing device 10.

Referring now to FIGS. 2–5, the viewing device 10 of the present invention further preferably comprises a low voltage lamp 58 (i.e., a light emitting diode or LED) which is disposed within the viewing surface 42 of the support member 40 in close proximity to the mirror 46. If the cover member 48 is included in the viewing device 10 and attached to the viewing surface 42, it is contemplated that the lamp 58 will extend through the cover member 48 as shown in FIG. 2. The lamp 58 is preferably secured within the support member 40 through the use of an adhesive.

Electrically connected to the lamp 58 is one end of an elongate primary wire segment 60. The primary wire segment 60 extends through the support member 40 and through the lumen 52 of the inner core 50. The end of the primary wire segment 60 opposite that electrically connected to the lamp 58 is electrically connected to a first coupler 62. Electrically connected to the first coupler 62 is a second coupler 64. Electrically connected to the second coupler 64 is one end of an elongate secondary wire segment 66, the opposite end of which is electrically connected to a power supply 68 (i.e., a battery). Electrically connected to the power supply 68 is a switch 70. The switch 70 is selectively movable between on and off positions, and is operative to place the lamp 58 into electrical communication with the power supply 68 when actuated to the on position, thus facilitating the illumination of the lamp 58. The first and second couplers 62, 64 are releasably attached to each other, and reside within the base unit 22 when the base housing 28 is releasably attached to the base mount 24. Advantageously, the first and second couplers 62, 64 may be detached from each other upon the detachment of the base housing 28 from the base mount 24. Thus, the second coupler 64, secondary wire segment 66, power supply 68 and switch 70 need only be electrically connected to the first coupler 62 when desired for a nighttime driving condition. Those of ordinary skill in the art will recognize that the lamp 58 may alternatively be activated via a remote control device or unit.

If the inner core 50 of the stem 34 is fabricated from a tubular metal or plastic material, the primary wire segment 60 will be advanced through the lumen 52 in the above-described manner. If the inner core 50 is alternatively fabricated from the links 56 or from a non-tubular material having a solid cross-sectional configuration, it is contemplated the primary wire segment 60 may be extended between the inner core 50 and outer sheath 54, or advanced along the outer surface of the inner core 50 and covered by the outer sheath 54 wrapped thereabout (if the outer sheath 54 comprises a strip).

In the viewing device 10, a pair of leaves 72 are attached to the outer sheath 54 of the stem 34 to complete the thematic whole of a flower configuration for the viewing device 10. However, as indicated above, the viewing device 10 need not necessarily be configured as a flower, in that other decorative configurations are contemplated by the present invention. When the viewing device 10 is mounted to the safety seat 18, the stem 34 may be bent or deformed as needed to facilitate the positioning of the mirror 46 at a prescribed or selected orientation relative to the head of the infant 16 residing within the safety seat 18. As seen in FIG. 1, the mirror 46 will preferably be positioned such that the driver 14 may view the infant 16 via the optical path including the rear view mirror 74 of the vehicle 12. Upon the releasable attachment of the second coupler 64 to the first coupler 62, the viewing device 10 may be used in nighttime driving conditions by illuminating the lamp 58 via the actuation of the switch 70 to the on position.

Because it mounted directly to the safety seat 18, any shifting or movement of the safety seat 18 relative to the rear seat 20 does not result in the disruption of the proper orientation of the mirror 46 relative to the infant 16 within the safety seat 18. Additionally, the relative close proximity of the mirror 46 to the head of the infant 16 maintains the proper viewing angle despite the infant 16 leaning its head to one side. Such close proximity also entertains the infant 16 by allowing the infant 16 to observe his/her reflection in the mirror 46. It is contemplated that the stem 34 of the viewing device 10 may be fabricated to have an overall length of twenty-four inches or more so as to provide greater freedom in achieving the proper orientation of the mirror 46 relative to the infant 16 when the base unit 22 is attached to the safety seat 18. It is also contemplated that the mirror 46 may be fabricated to have a diameter (if circular) of six inches or more to facilitate greater ease in observing the infant 16 within the safety seat 18. In this respect, the larger size of the mirror 46 maintains a clear, undistorted view of the infant 16. Moreover, those of ordinary skill in the art will recognize that the viewing device 10, due to its inclusion of the illuminable lamp 58, may be used with a forward facing safety seat 18 solely to illuminate the face of the infant 16 during nighttime driving conditions. The releasable attachment of the base housing 28 to base mount 24 allows the support member 40 and hence the mirror 46 to be moved out of the way to put the infant 16 into or remove the infant 16 from within the safety seat 18 without having to bend or deform the stem 34.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A device for viewing an infant within a rearwardly facing safety seat disposed on a rear seat of a vehicle, the device comprising:

a base unit including a base mount rigidly attachable to the safety seat and a base housing releasably attached to the base mount;

an elongate, bendable stem having opposed proximal and distal ends, the proximal end of the stem being attached to the base housing of the base unit; and a reflective surface attached to the distal end of the stem;

the stem being deformable to maintain the reflective surface at a selected orientation relative to the safety seat.

2. The device of claim 1 wherein the stem is fabricated from a deformable metal material.

3. The device of claim 1 wherein the stem is fabricated from a multiplicity of links pivotally connected to each other in end-to-end fashion.

4. The device of claim 3 wherein each of the links is fabricated from a plastic material.

5. The device of claim 1 wherein the reflective surface is a mirror.

6. The device of claim 1 wherein the base mount and the base housing are each fabricated from a plastic material.

7. The device of claim 1 further comprising a support member attached to the distal end of the stem, the reflective surface being attached to the support member.

8. The device of claim 7 wherein the support member is fabricated from a foam rubber material.

9. The device of claim 7 wherein:

the support member defines a viewing surface having a recess formed therein; and the reflective surface is disposed within the recess.

10. The device of claim 9 further comprising a cover member which is attached to the viewing surface and circumvents the reflective surface.

11. The device of claim 10 wherein the cover member is fabricated from a material selected from the group consisting of:

foam rubber; and felt.

12. The device of claim 9 wherein the recess and the reflective surface have complimentary, generally circular configurations.

13. The device of claim 9 wherein the stem comprises:

a inner core; and an outer sheath extending over the core;

the core and the sheath each being fabricated from a bendable material.

14. The device of claim 13 wherein the core is fabricated from a material selected from the group consisting of:

metal; and plastic.

15. The device of claim 13 wherein the sheath is fabricated from a material selected from the group consisting of:

plastic;

foam rubber; and felt.

16. The device of claim 13 further comprising:

a lamp disposed within the viewing surface in close proximity to the reflective surface;

an elongate primary wire segment having opposed first and second ends, the first end being electrically connected to the lamp;

a power supply electrically connected to the second end of the primary wire segment; and a switch electrically connected to the power supply and operative to selectively place the lamp into electrical communication therewith.

17. The device of claim 16 further comprising:

a first coupler electrically connected to the second end of the primary wire segment;

a second coupler electrically connected to the first coupler; and an elongate secondary wire segment having a first end electrically connected to the second coupler and a second end electrically connected to the power supply;

the first and second couplers being releasably attached to each other and detachable from each other upon the detachment of the base housing from the base mount.

18. The device of claim 17 wherein:

the core is tubular and defines a lumen extending longitudinally therethrough; and the primary wire segment extends through the lumen of the core.

* * * * *